United States Patent [19]

Smith

[11] Patent Number: 5,569,070

[45] Date of Patent: Oct. 29, 1996

[54] CONTROLLED VOLUME MEAT APPORTIONER

[76] Inventor: Jeffrey P. Smith, 128 Oakes Dr., Columbus, Ohio 43207

[21] Appl. No.: 594,420

[22] Filed: Jan. 31, 1996

Related U.S. Application Data

[63] Continuation of Ser. No. 477,115, Jun. 7, 1995, abandoned.
[51] Int. Cl.$^6$ ........................................ A22C 7/00
[52] U.S. Cl. ............................. 452/174; 426/518
[58] Field of Search ............................. 452/174; 426/518

[56] References Cited

U.S. PATENT DOCUMENTS

| | | | |
|---|---|---|---|
| 4,356,205 | 10/1982 | Richards | 452/174 |
| 4,544,560 | 10/1985 | O'Connell | 426/104 |
| 4,663,804 | 5/1987 | Langen et al. | 452/138 |
| 4,862,558 | 9/1989 | Langen et al. | 452/138 |
| 4,941,379 | 7/1990 | Gasbarro | 83/409.2 |
| 4,993,110 | 2/1991 | Langen et al. | 452/138 |

FOREIGN PATENT DOCUMENTS

| | | | |
|---|---|---|---|
| 2616299 | 12/1988 | France | 452/174 |
| 4122570 | 1/1993 | Germany | 452/174 |

OTHER PUBLICATIONS

Photo Exhibits 1–3 dated Sep. 16, 1994.
Letter from J. Reed, McCarty Foods to Mike Gasbarro, Prime Equipment.

*Primary Examiner*—Willis Little
*Attorney, Agent, or Firm*—Mueller and Smith, LPA

[57] ABSTRACT

Apparatus for apportioning a cut of whole muscle meat into a product having margins of a select size and an excess trim portion. An upper die is provided as having a forward blade portion and a rearward compression surface extending about the blade portion. The blade portion defines with the compression surface at least a portion of the margins of the product. At least one lower platen is provided as having a support surface for receiving the cut of whole muscle meat thereon. The support surface has a slot configured to receive the blade portion therewithin intermediate a first and second side wall thereof, and a bearing surface configured to abuttingly engage the compression surface. An actuator assembly moves the upper die from a first position spaced above the lower platen to a second position wherein the compression surface abuttingly engages the bearing surface. The compressive engagement between the upper die and lower platen is effective to apportion the cut of whole muscle meat into the product and trim portion.

22 Claims, 15 Drawing Sheets

CONTROLLED VOLUME MEAT APPORTIONER

This application is a continuation, of application Ser. No. 08/477,115, filed Jun. 7, 1995 now abandoned.

BACKGROUND OF THE INVENTION

The present invention relates broadly to the production of an apportioned meat product having a controlled volumetric size and weight.

The processing of meat, and especially of poultry, has burgeoned to where approximately four (4) billion chickens are processed and sold yearly in the United States alone. Indeed, the U.S. consumption of poultry has increased to where, for the first time in 1988, it exceeded that of beef. Such increase has been attributed to the recommendation of many medical groups that red meats be substituted with poultry or fish having a relatively lower percentage of saturated fats as a means of reducing overall serum cholesterol levels and the attendant risk of heat disease.

Spurred largely by consumer demand, producers of prepared and packaged foods, as well as restaurateurs, have been using more and more poultry, and have required suppliers to deliver products meeting stringent size and weight specifications. More recently restaurants, including the popular fast food chains, seeking to provide customers with a consistent and quality product, have tightened specifications not only as to uncooked size and weight ranges, but also as to cooking times and cooked sizes and weights. However, and particularly with respect to the bun-sized, whole-muscle chicken breast fillets presently favored by consumers as an alternative to hamburger patties, the processing industry has had difficulty meeting the tightened product specifications imposed by buyers.

Complicating the problems of meat processors in meeting the product specifications of the buyers, is that the hatcheries which supply the broiler-sized chickens for processing have moved toward raising larger birds for improved slaughtering productivity. The restaurants and other buyers of the sized product, however, have not adjusted their size and weight requirements accordingly. Meat processors therefore are faced with having to apportion a cut of meat which is both thicker and larger than those previously available.

Machines for the automated portioning of whole muscle meat products such as poultry breasts have been proposed. For example, U.S. Pat. No. 4,941,379 describes an apparatus for trimming poultry meat to a select size, shape, and weight. The apparatus includes a support frame upon which is mounted a plurality of mandrels aligned in a side-by-side relationship for movement in a continuous path along the frame. Each mandrel has a sizing chamber adapted to receive a given size and volume of a poultry breast cut through a top opening thereof. The sizing chamber is formed as having front and rear walls which are yieldably connected, with means being provided along the continuous path of the mandrel to compress the walls assuring a consistent sizing chamber volume. The mandrels are loaded at a given point along the path for movement past a cutting station which automatically trims any excess meat extending beyond the confines of the sizing chamber. After trimming, the front wall of the sizing chamber is released to return to its original position. The mandrel then continues along the defined path and is inverted as it approaches an unloading station where means are provided for urging the sized meat portion out of the sizing chamber.

Assuming a fixed muscle density of the meat and a consistent volumetric capacity of the sizing chamber, meat portions of a uniform weight may be obtained. However, as the meat is not irreversibly compressed within the sizing chamber sufficient to overcome the inherent orientation memory of the muscle fibers, the portions have been observed to contract after trimming to return somewhat to their original, uncut dimensions. Further contraction of the muscle fibers has been seen during cooking wherein the protein in the muscle tissue is heat denatured. The result is a product having piece to piece size and thickness variations which defies attempts to implement effective cooking schedules.

Moreover, the apparatus described in U.S. Pat. No. 4,941,379 alters the meat in only two dimensions, i.e., length and width, both in a single plane. As the meat to be portioned increases in overall size in three dimensions, however, the cut portion thereof, having been sized only in two dimensions, manifests a corresponding increased thickness. Again, although meat portions of a uniform weight may be obtained, consistency as to uniformity of size and thickness may not necessarily be achieved.

Some poultry breast processors have attempted to control the thickness dimension of the product by first making an axial cut through a cross section of a horizontal plane parallel to the fascia of the meat. The meat then is handled a second time for sizing. Other processors first pass the meat through a meat press and/or scarifier, which likewise involves a second handling step.

Another machine proposed for the automated sizing of whole muscle meat products employs a reciprocating arrangement of a pair of sizing heads, each of which includes an opposing pair of upper and lower platens, and a die which is apertured to receive the upper and lower platens therethrough. The meat to be portioned, such as a poultry breast butterfly, is received on the lower platens, and the upper platens are extended downwardly toward the lower platen to compress the meat therebetween. The die then is moved downwardly over the upper and lower platens, with any of the meat extending over the margins thereof being sheared between the inner walls of the die apertures and the outer walls of the lower platens.

Although the described arrangement achieves some degree of consistency as to portion size and thickness, it has been observed to result is less than a 95% separation efficiency as between the portion and the trim. Each cut therefore often must be hand trimmed to attain an acceptable profile. It is speculated that the shearing action developed between the walls of the die apertures and lower platens is insufficient to effect a complete separation of the muscle tissue from the fascia in which it is enveloped.

In view of the foregoing, it will be appreciated that improvements in meat processing, and particularly in the production of an apportioned meat product having a controlled size and weight would be well-received by industry. Especially desired would be the capability to control the size, including thickness, and weight of a poultry product such as the whole muscle chicken breast increasingly favored by consumers as a healthier substitute for hamburger.

BROAD STATEMENT OF THE INVENTION

The present invention is directed to the production of an apportioned meat product having a controlled volumetric size and weight. In providing for the automated control of the orientation memory, thickness, size, and weight of a raw meat product such as whole muscle chicken breast, the present invention affords a consistently apportioned product in accordance with even the most stringent specifications.

Heretofore, most meat processing was conducted with no control over all three dimensions of a meat cut, and additionally with a relatively poor degree of separation as between the sized portion and the trim removed therefrom. The present invention, however, utilizes a dual stage cutting head for increased trim separation, as well as a controlled pressure to advantageously affect the critical third dimension, i.e., thickness, of the meat cut through the disruption of the integrity of the muscle fiber thereof. The result is an apportioned meat product of a specified volumetric size and weight having a reduced orientation memory both in a raw and in a cooked form.

One aspect of the invention therefore involves an apparatus for apportioning a cut of whole muscle meat into a product having margins of a select size and an excess trim portion. An upper die is provided as having a forward blade portion and a rearward compression surface extending about the blade portion. The blade portion defines with the compression surface at least a portion of the margins of the product. At least one lower platen is provided as having a support surface for receiving the cut of whole muscle meat thereon. The support surface has a slot configured to receive the blade portion therewithin intermediate a first and second side wall thereof, and a bearing surface configured to abuttingly engage the compression surface. An actuator assembly moves the upper die from a first position spaced above the lower platen to a second position wherein the compression surface abuttingly engages the bearing surface. The compressive engagement between the upper die and lower platen are effective to apportion the cut of whole muscle meat into the product and trim portion.

A further aspect of the present invention involves an apparatus for apportioning a cut of whole muscle meat into an product and a trim portion which includes an upper die, at least four lower platens, an actuator assembly, and an indexing assembly. The upper die is provided as having a forward blade portion and a rearward compression surface extending about the blade portion. The blade portion defines with the compression surface at least a portion of the margins of the product. Each of the four lower platens are provided as having a support surface for receiving the cut of whole muscle meat thereon. Each support surface has a slot configured to receive the blade portion therewithin intermediate a first and second side wall thereof, and a bearing surface configured to abuttingly engage the compression surface. The actuator assembly moves the upper die from a first position spaced above one of the lower platens to a second position wherein the compression surface abuttingly engages the bearing surface effective to apportion the cut of whole muscle meat into the product and trim portion. The indexing assembly successively cycles each of the platens between a first station disposed in registration with the upper die, and at least a second, third, and fourth station out of registration with the upper die.

Yet a further aspect of the present invention involves a method for apportioning a cut of whole muscle meat into a product having margins of a select size and an excess trim portion. An upper die is provided as having a forward blade portion and a rearward compression surface extending about the blade portion, the blade portion defining with the compression surface at least a portion of the margins of the product portion. For mating with the upper die, at least one lower die is providing as having a support surface for receiving the cut of whole muscle meat thereon. The support surface has a slot configured to receive the blade portion therewithin intermediate a first and second side wall thereof, and a bearing surface configured to abuttingly engage the compression surface. With the cut of whole muscle meat disposed on the support surface of the lower platen, the upper die is moved from a first position spaced above the lower platen to a second position wherein the compression surface abuttingly engages the bearing surface effective to apportion the cut of whole muscle meat into the product and trim portion.

Advantages of the present invention include a capability for apportioning a meat product to a consistent volumetric size and weight. Additional advantages includes the production of a meat product which maintains a net shape both in a raw and in a cooked form. These and other advantages will become readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
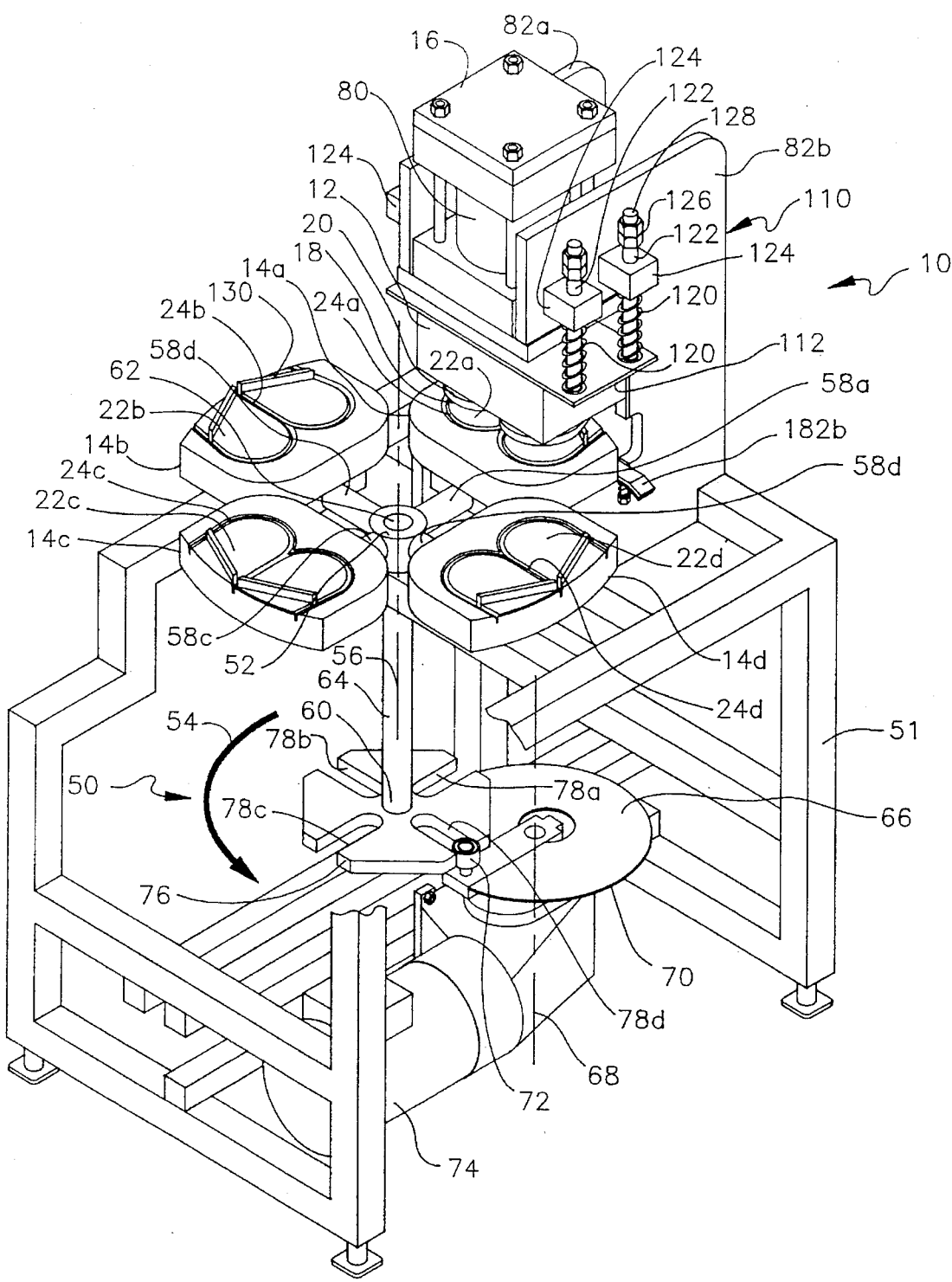
FIG. 1 is a perspective view of an apparatus in accordance with the present invention specially adapted for apportioning a chicken breast butterfly into a pair of cuts each having a controlled volumetric size and weight.
Figure 2:
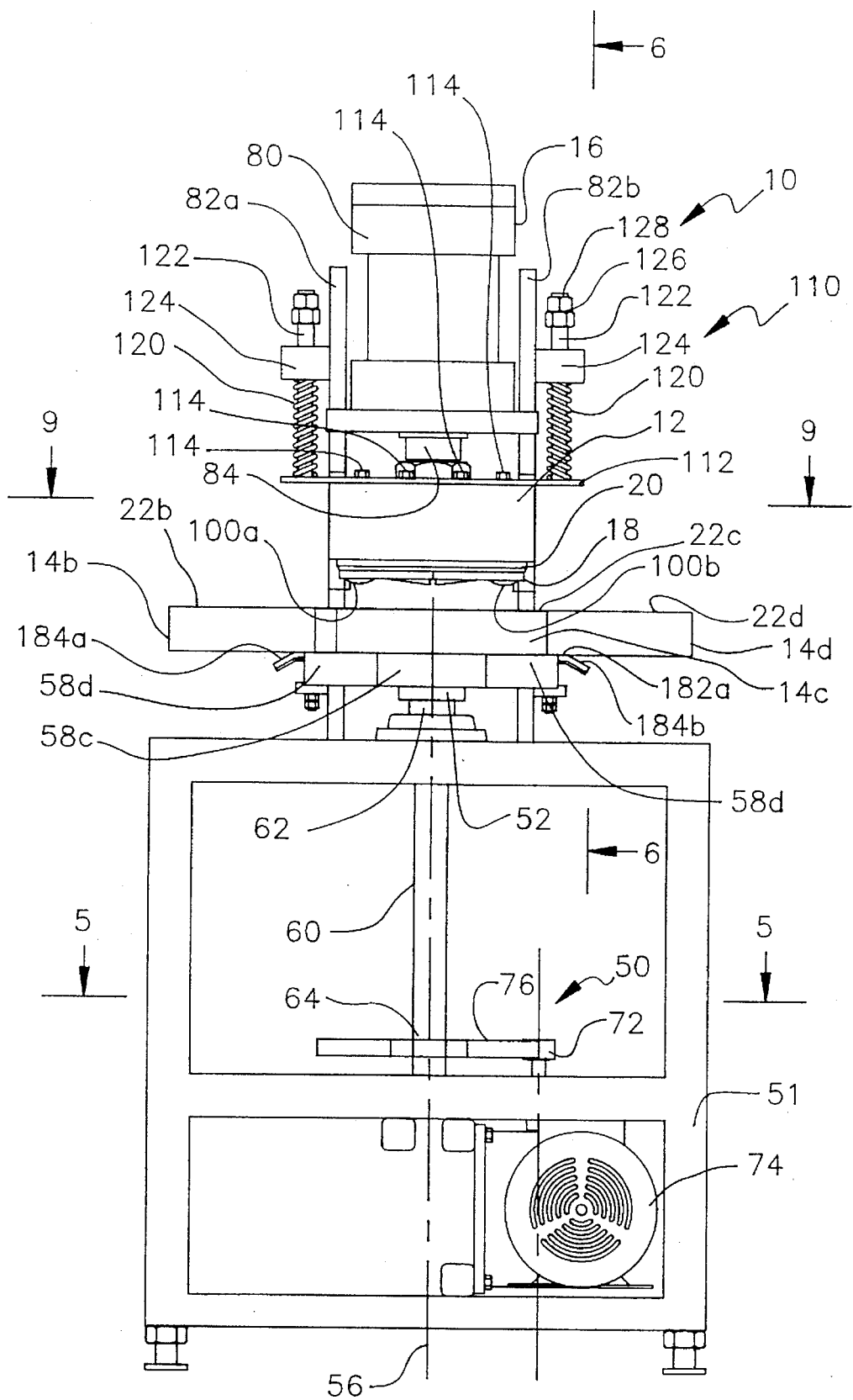
FIG. 2 is a front view of the apparatus of FIG. 1.
Figure 3:
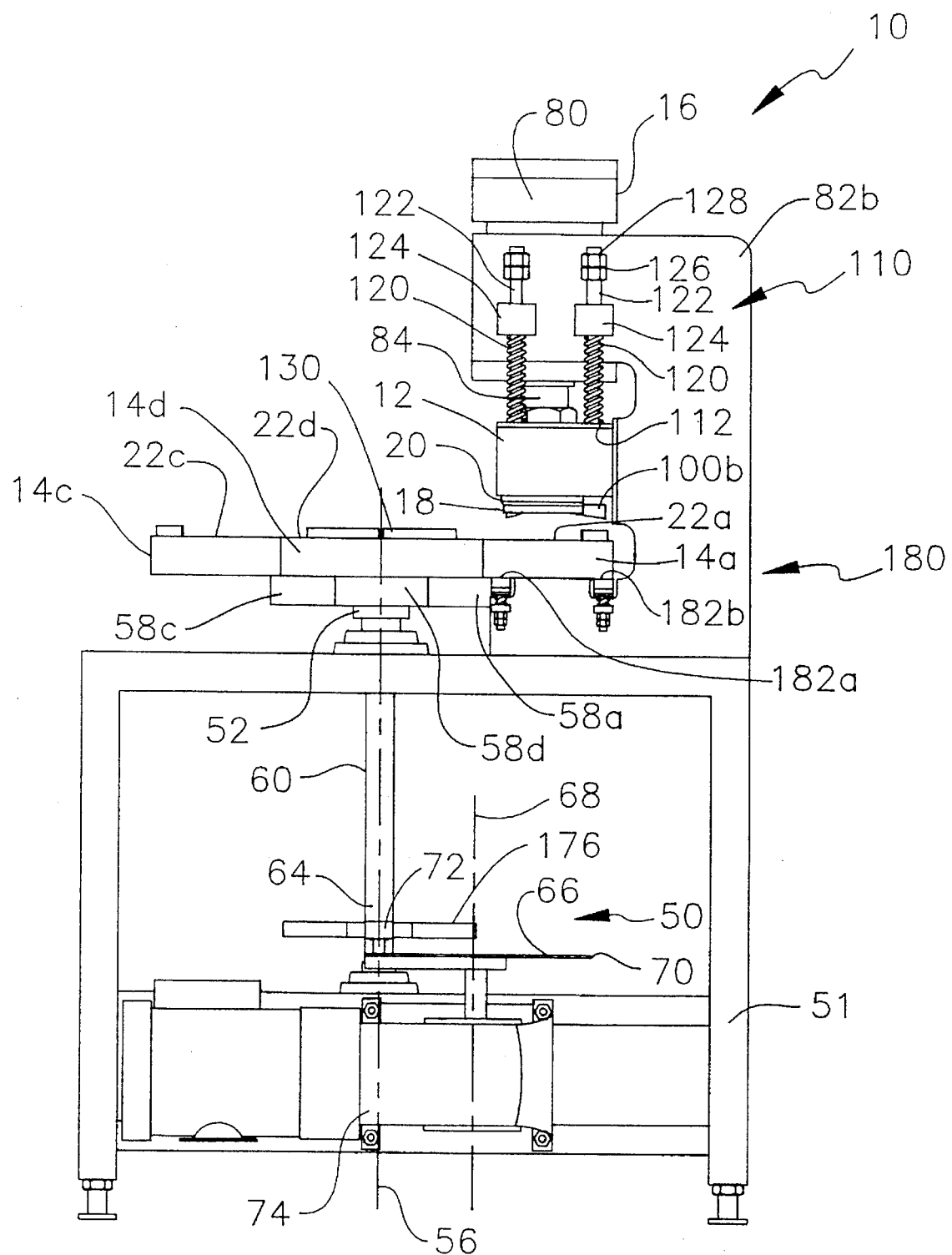
FIG. 3 is a right side elevational view of the apparatus of FIG. 1.

Referring to the figures wherein like parts are designated with like reference numerals, shown generally at 10 in FIGS. 1–3 is an apparatus for separating a cut of whole muscle meat (FIG. 10) into an apportioned product having margins of select size and an excess trim portion. In accordance with the present invention, apparatus 10 includes an upper die, 12, at least one and, preferably, at least four lower platens, 14a–d, and an actuator assembly, 16. Upper die 12 may be seen to be formed as having a forward blade portion, 18, and at least one rearward compression surface, 20, which extends about blade portion 18. Each of lower platens 14, in turn, may be seen to be formed as having a support surface, 22a–d, for receiving the cut of whole muscle meat thereon, with an integrally-formed slot, 24a–d (FIG. 1), configured to receive blade portion 18 therewithin. In view of the discourse to follow hereinafter, it will be appreciated that blade portion 18 and compression surfaces 20 of upper die 12 define at least a portion of the margins of the apportioned product.

Figure 4:
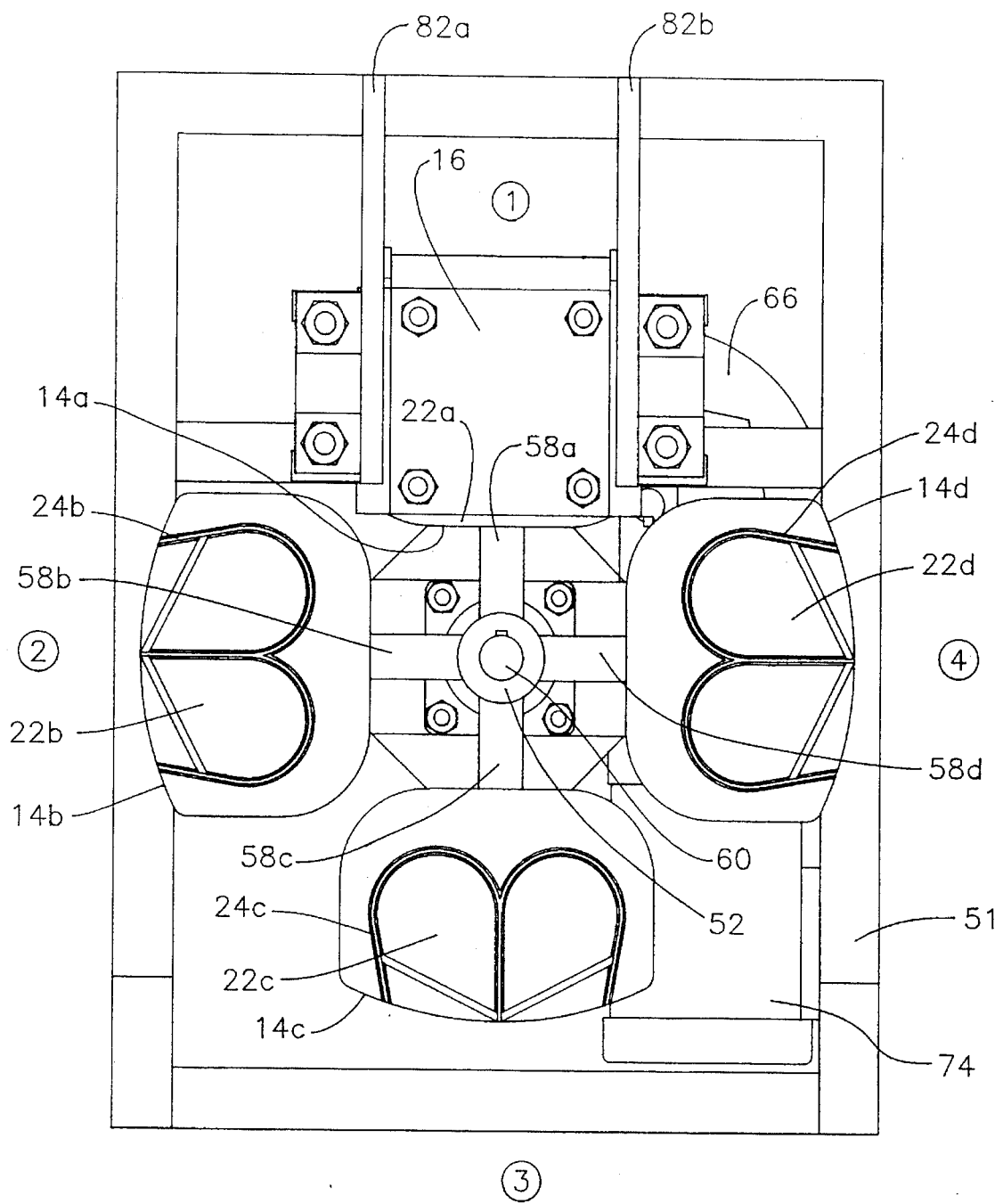
FIG. 4 is a top view of the apparatus of FIG. 1.

Apparatus 10 further is shown in FIGS. 1–3 as including an indexing assembly, represented generally at 50, for successively cycling each lower platen 14 between at least a first station, shown for platen 14a to be disposed in registration with upper die 12, and at least one other station, shown respectively for lower platens 14b–d to be out of registration with die 12. Looking momentarily to FIG. 4, it may be seen that with the illustrated arrangement of apparatus 10, at least four separate stations, respectively designated at 1–4, may be defined. In this regard, indexing assembly 50 is actuable to drive each lower platen 14 from a first station, 1, through, in succession, a second, 2, third, 3, and fourth, 4, station. With station 1 being defined as is shown for the apportioning of the meat cut, station 2 may be defined for the removal of the apportioned product from the lower platen 14. Station 3 then may be defined for the loading of an unapportioned meat cut onto a lower platen 14, with station 4 being made available for further staging.

Figure 5:
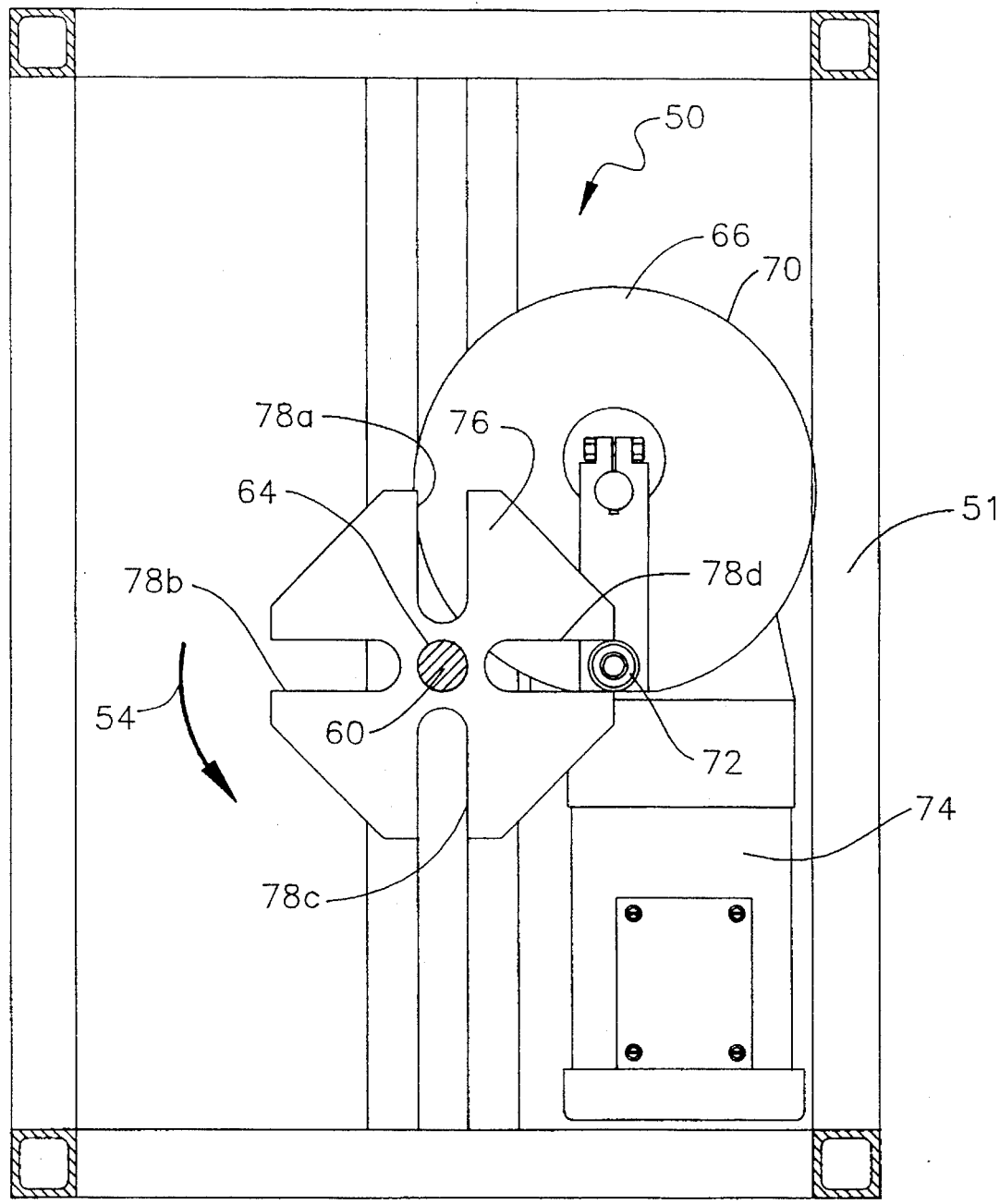
FIG. 5 is a cross-sectional view of the apparatus of FIG. 1 taken through line 5—5 of FIG. 2.

Returning to FIGS. 1–3, indexing assembly 50 may be seen to be supported on a generally tubular base, 51, and to comprise a hub, 52, mounted for rotation in the direction shown at 54 (FIG. 1) about a first axis, 56. Hub 52 is formed as having a plurality of outwardly extending arms, 58a–d (FIG. 1), each supporting a corresponding one of a lower platen 14. A shaft, 60, is provided to extend along first axis 56 from a first end, 62, coupled to hub 52, to a second end, 64. A turntable member, 66 (FIGS. 1 and 3), is mounted for rotation about a second axis, 68, which is spaced-apart from first axis 56. Referring additionally to FIG. 5, turntable member 66 may be seen to be configured as having a generally circular periphery, 70, and an upstanding spindle or roller, 72, disposed adjacent the periphery. A drive motor, 74, is operably coupled to turntable member 66 for its rotation driving spindle 72 along a generally circular locus defined by periphery 70. In turn, a follower member, 76, is coupled to the second end 64 of shaft 60, and is formed as having a plurality of rebates, 78a–d, disposed as opposing pairs extending radially inwardly toward first axis 156. Each of rebates 78 is successively engaged by spindle 72 effecting the rotation of shaft 60 and, correspondingly, hub 52 to cycle each lower platen 14 between each of the stations.

As aforementioned, with each lower platen being successively cycled into and out of registration with die 12, staging areas may be defined for utilization within various production protocols. For example, separate staging areas advantageously may be defined wherein the raw or unprocessed meat cuts are loaded onto a lower platen 14 prior to apportioning, and then are unloaded therefrom after apportioning. In this regard, the angular or rotational speed of turntable member 66 may be controlled to govern the residence time of each platen 14 at each of the defined staging areas for meeting desired production schedules.

Figure 6:
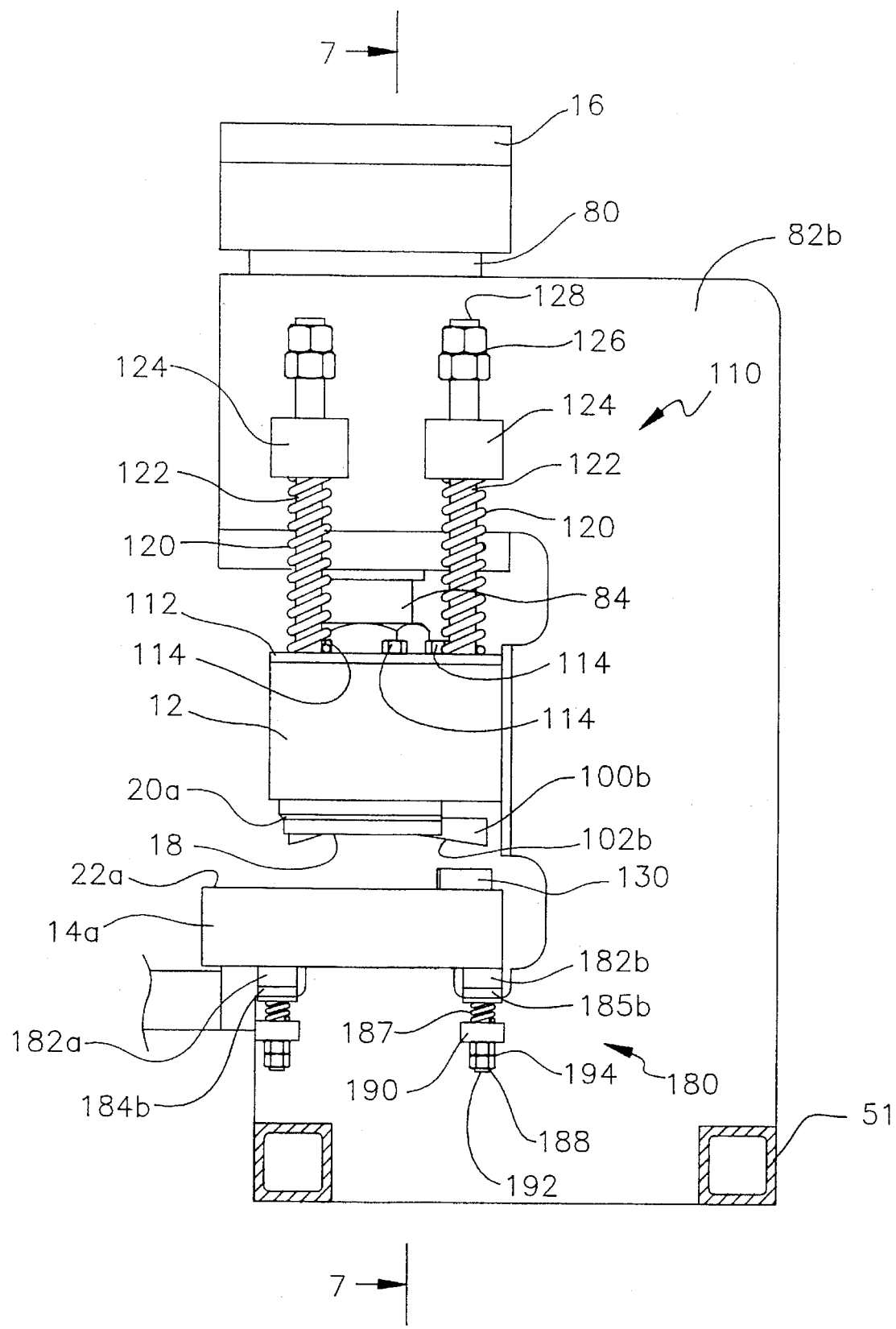
FIG. 6 is a cross-sectional view taken through line 6—6 of FIG. 2 showing, in enhanced detail, the cutting head assembly of the apparatus of FIG. 1 as having an upper die disposed in a first, non-cutting position with respect to a corresponding lower platen.
Figure 7:
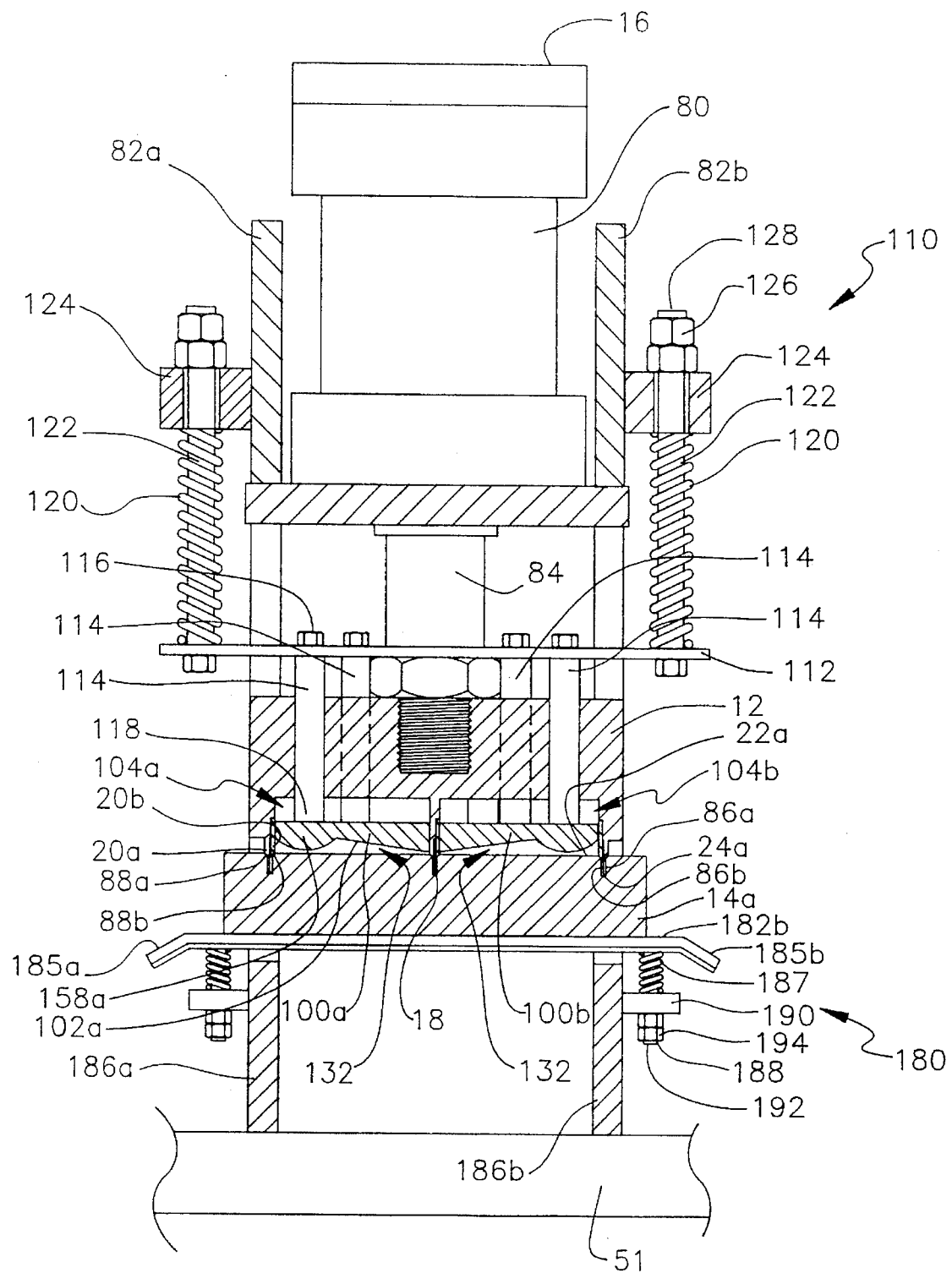
FIG. 7 is a cross-sectional view taken through line 7—7 of FIG. 6 showing the upper die of the cutting head assembly of FIG. 6 as moved to a second position in a cutting engagement with the lower platen.

Referring now particularly to FIGS. 6 and 7, actuator assembly 16 is shown to include a hydraulic cylinder, 80, supported on a frame, 82a and 82b, and to have a ram, 84, threadably engaged with die 12. In the arrangement shown, cylinder 80 of actuator assembly 16 is extendible to move upper die 12 from an upper, non-cutting position shown in FIG. 6 to be spaced above lower platen 14a to a lower, cutting position shown in FIG. 7. Looking momentarily to FIG. 10, wherein upper die 12 is shown to reveal the details of its construction, it may be seen that forward blade portion 18 is configured to depend from die 12 to define the margins of the apportioned meat product. For further defining the product margins, rearward compression surface 20 now is revealed as a pair of compression surfaces, 20a and 20b, between which forward blade portion 18 is interposed.

Returning to FIG. 7, as is shown for slot 24a of lower platen 14a, each slot 24 is configured to receive blade portion 18 intermediate a first side, 86a, and a second side, 86b, thereof. Likewise, each slot 24 is formed as having at least one bearing surface, a pair of which are shown for slot 24a at 88a and 88b, configured to engage a corresponding compression surface 20 of upper die 12. As is depicted in enhanced detail in FIG. 8, with upper die 12 disposed in its lower or cutting position, compression surfaces 20 thereof are made to abuttingly engage bearing surfaces 88 of lower platen 14a with blade portion 18 being received within slot 24a in a shearing arrangement with at least one of side walls 86 thereof. It will be appreciated that with a cut of whole muscle meat (not show) being received on a support surface 22 of a lower platen 14 to extend at least partially over a slot 24 thereof, the abutting engagement between compression surfaces 20 and bearing surfaces 88 is effective to completely sever the cut into an apportioned product and an excess trim portion. Such severance is synergistically assisted by the preliminary shearing action effected between blade portion 18 and at least one side wall 86 of a slot 84. In this regard, apparatus 10 of the present invention would be expected to provide a more complete trim separation as compared to those machines heretofore known in the art.

Although blade portion 18 of upper die 12 is shown in the figures to be interposed between a pair of compression surfaces 20 corresponding with an associated pair of bearing surfaces 88 on lower platens 14, it will be appreciated that only one such compression and bearing surface generally will be necessary to effect an essentially complete separation of the trim portion from the apportioned product. Importantly, however, compression surfaces 20 are provided to engage bearing surfaces 88 delimiting the travel of blade portion 18 within a slot 24. In this way, a crushing effect is achieved between the surfaces which separates the meat and obviates the need to have the travel of blade portion 18 bottom out within a slot 24. Such an arrangement preserves the edge, which is shown at 90 to be formed of a generally chamfered surface, of blade portion 18, and thereby decreases the maintenance heretofore associated with the periodic sharpening thereof.

Figure 11:
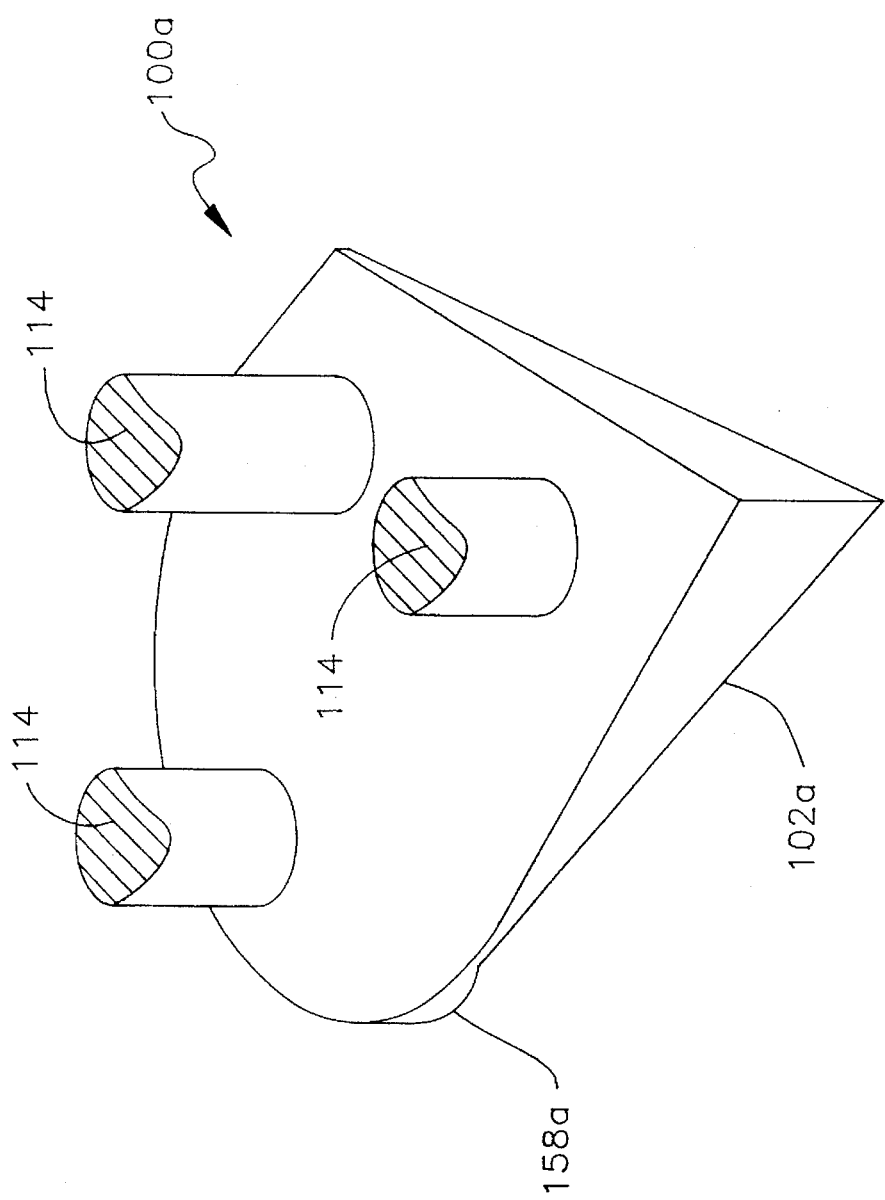
FIG. 11 is a perspective view showing an upper platen of FIG. 7 in enhanced detail.

For the compression of the meat cut to a select thickness prior to its apportioning, apparatus 10 preferably is provided as having at least one upper platen, a pair of which are shown in FIG. 7 at 100a–b. As also may be seen in enhanced detail in FIG. 11 for upper platen 100a, each upper platen 100 is formed as having a forward contact surface, 102a–b, for contact with the meat cut being processed. In this regard, each of upper platens 100 is movable from an upper position, which is shown in FIG. 6 to be spaced above a lower platen 14, to a lower position, which is shown in FIG. 7. In the lower position, the forward contact surface 102 of each upper platen 100 is made to engage the meat cut with a pressure effective for the irreversible compression of the cut to a select thickness. By the term "irreversible compression," it is meant that the meat is compressed with a force sufficient to disrupt the muscle fibers and the inherent orientation memory thereof. The result is an apportioned product which maintains a net shape in both a raw and a cooked form, and which has a consistent thickness allowing the implementation of standardized cooking schedules.

Figure 9:
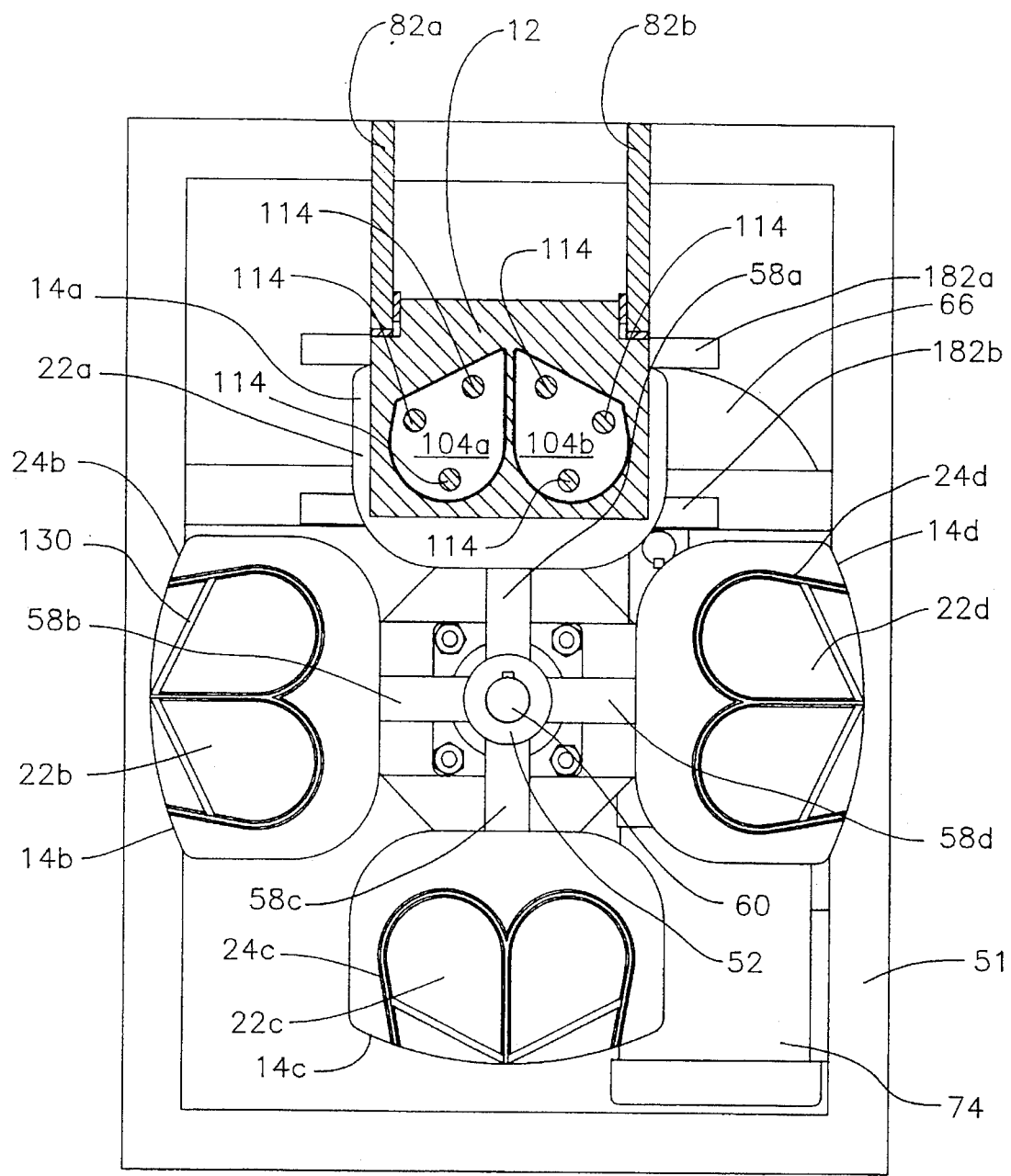
FIG. 9 is a cross-sectional view of the apparatus of FIG. 1 taken through line 9—9 of FIG. 2.
Figure 10:
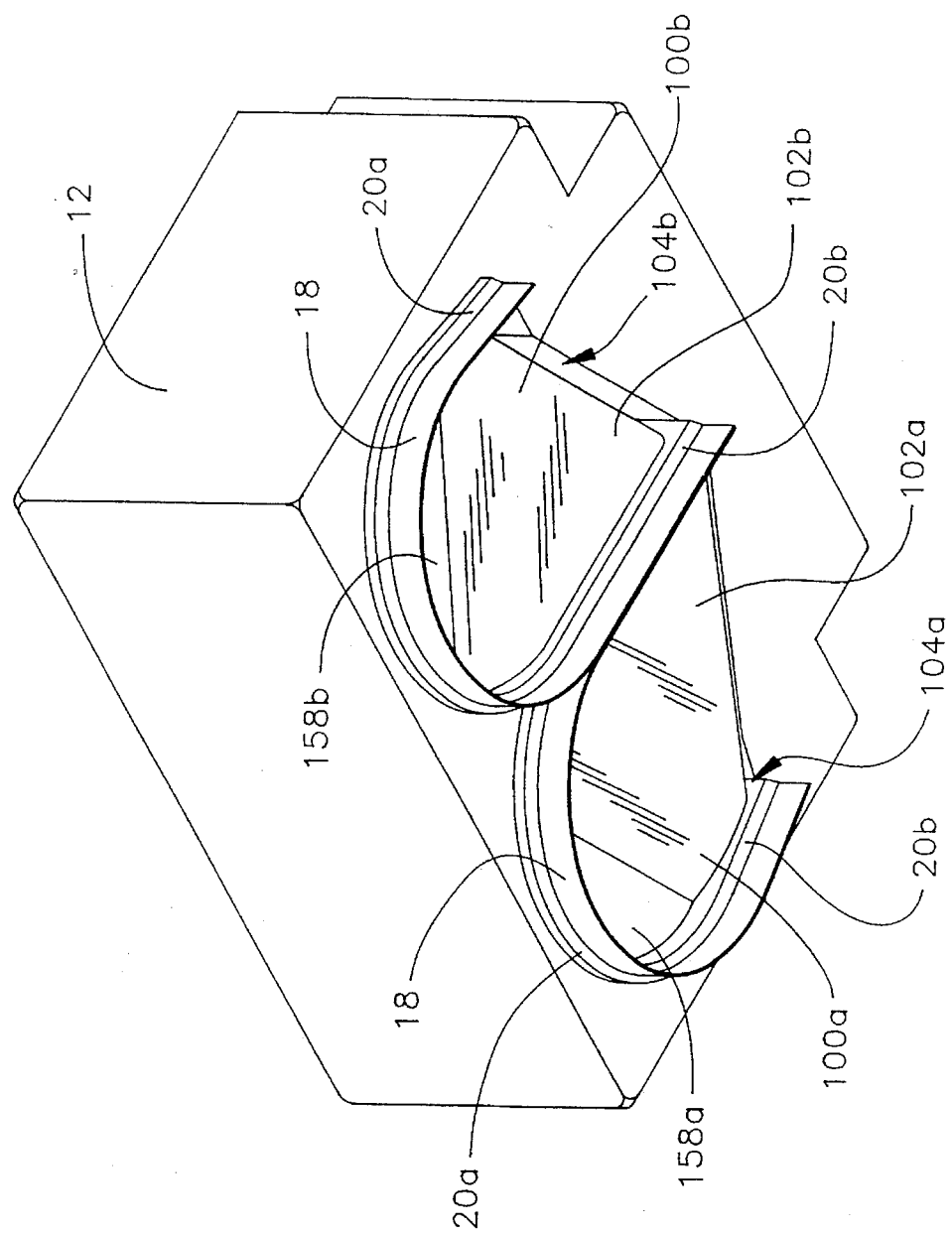
FIG. 10 is a perspective view showing the upper die of FIG. 7 in enhanced detail.

Looking now momentarily to FIGS. 9 and 10, it may be seen that die 12 may be formed as having at least one recess, a pair of which are shown at 104a–b to be at least partially circumscribed by blade portion 18 and at least one compression surface 20. As is shown in FIG. 7, each recess 104 is configured to receive at least a portion of a corresponding upper platen 100 therewithin as die 12 is moved to its second or cutting position with each lower platen 100 being biasedly disposed in its lower position in engagement with the meat cut being processed. In this regard, a biasing assembly, represented generally at 110, is provided for normally biasing of each upper platen 100 in its lower position.

As is shown in detail in FIGS. 6 and 7, biasing assembly 110 may include a support plate, 112, mounted for movement along frame 82. For coupling support plate 112 to platens 100, at least one coupling member, a plurality of which are commonly designated at 114, extends through die member 12 from a first end, 116, fastened to support plate 112 to a second end, 118, fastened to an upper platen 100. At least one compression spring member, a plurality of which are commonly designated at 120, is interposed generally between frame 82 and support plate 112 for normally biasing the plate in the orientation shown in FIG. 7 disposing upper platens 100 in their lower positions. As shown, each spring member 120 is coaxially disposed on a corresponding suspension rod, commonly designated at 122, each extending slidably through an outwardly extending flange portion, 124, of frame 82. In such an arrangement, spring members 120 are compressible by the movement of die 12 to its first position to move upper platens 100 to their upper position spaced above a lower platen 14. That is, spring members 120 are extended to normally bias support plate 112 in the orientation shown in FIG. 7 disposing upper platens 100 in their lower position. Die 12, however, is movable intermediate support plate 112 and a lower platen 14 into an abutting engagement with support plate 112 moving it along frame 82 into the orientation shown in FIG. 6 disposing upper platens 100 in their upper position.

Looking again to FIG. 7, it may be seen that for accommodating the processing of meat cuts having different thickness, or for adjusting the final thickness of the apportioned meat product, each suspension rod 122 may be provided as having stop member, one of which is shown at 126. As is shown, each stop member 126 may be provided as a locking pair of nuts threadably engaged to a threaded upper end, 128, of each suspension rod, and positioned to abuttingly engage a corresponding flange portion 124 adjustably delimiting the downward travel of support plate 112 and, accordingly, upper platens 100. With stop members 126 so engaged, the downward travel of die 12 may continue into an abutting engagement with a bearing surface 88 of a lower platen 14, with upper platens 100 being at least partially received within a corresponding recess 104 of die 12. Advantageously, the described arrangement of die 12 and upper platens 100 obviates the need for a separate cylinder or other powered actuator controlling the travel of upper platens 100.

Returning to FIG. 1, each lower platen 14 is illustrated as having at least one upstanding wall, one of which is shown at 130 as extending along support surface 22b of lower platen 14b. Referring to FIG. 7, it will be appreciated that, with die 12 disposed in its second position and with upper platens 100 disposed in their lower position, each wall 130 defines an interior cavity, commonly designated at 132, of a select volume with a lower platen support surface 22, die recesses 104, and an upper platen forward contact surface 122. Advantageously, the cut of whole muscle meat being processed may be irreversibly compressed by the upper platens 100 effective to substantially fill each interior cavity 132. In this way, as a constant volume of meat is assured and assuming a given meat density, an apportioned product having a consistent weight may be produced.

Figure 12:
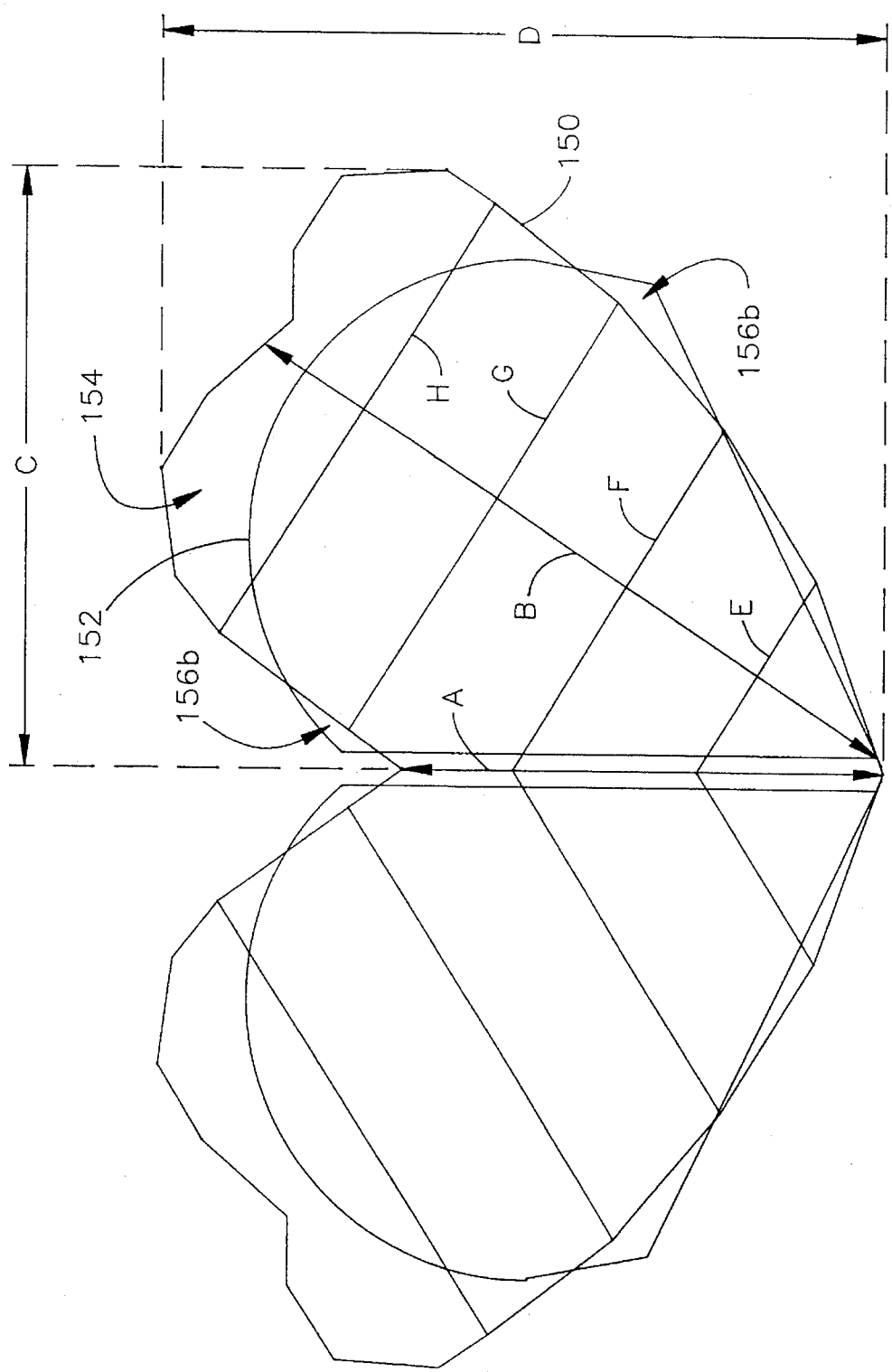
FIG. 12 is a schematic view of a chicken breast butterfly as divided into two separate cuts and as mapped to detail the thickness profile thereof.

In general, the meat cuts being processed will not be of a uniform thickness. For example, an unprocessed poultry breast butterfly cut is illustrated schematically in FIG. 12 at 150. As quantified in Table 1, one half of the butterfly cut is defined as having dimensions A, B, C, and D, and is mapped as having a thickness profile given by contour lines E, F, G, and H. Additionally shown in FIG. 12 are the margins of the apportioned product which are represented at 152 as being configured to define what is termed an "ice cream cone" shape which is generally favored by restaurants and the like. Thus, the area defined at 154 represents the excess trim portion of poultry breast cut 150, with the areas defined at 156a and 156b representing the areas of a cavity 132 (FIG. 7) which must be filled by the irreversible compression of breast cut 150. To ensure that areas 156 are filled, upper platens 100 may be configured, as is shown in cross-section in FIG. 7 and in perspective in FIG. 11, to have a profile selected to conform to the surface geometry of the meat cut being processed. Specifically, projections 158a and 158b are provided to effect the flow of breast cut 150 filling areas 156.

TABLE 1

Average Dimensions and Thickness Profile of
One Half of a Typical Poultry Breast Butterfly Cut

| Contour or Dimension Line (FIG. 10) | Average Value |
| --- | --- |
| A | 4.08 in (10.36 cm) |
| B | 6.33 in (16.08 cm) |
| C | 4.81 in (12.22 cm) |
| D | 5.97 in (15.16 cm) |
| E | 1.97 in (5.00 cm) |
| F | 3.19 in (8.10 cm) |
| G | 3.95 in (10.05 cm) |
| H | 4.13 in (10.49 cm) |

Figure 13:
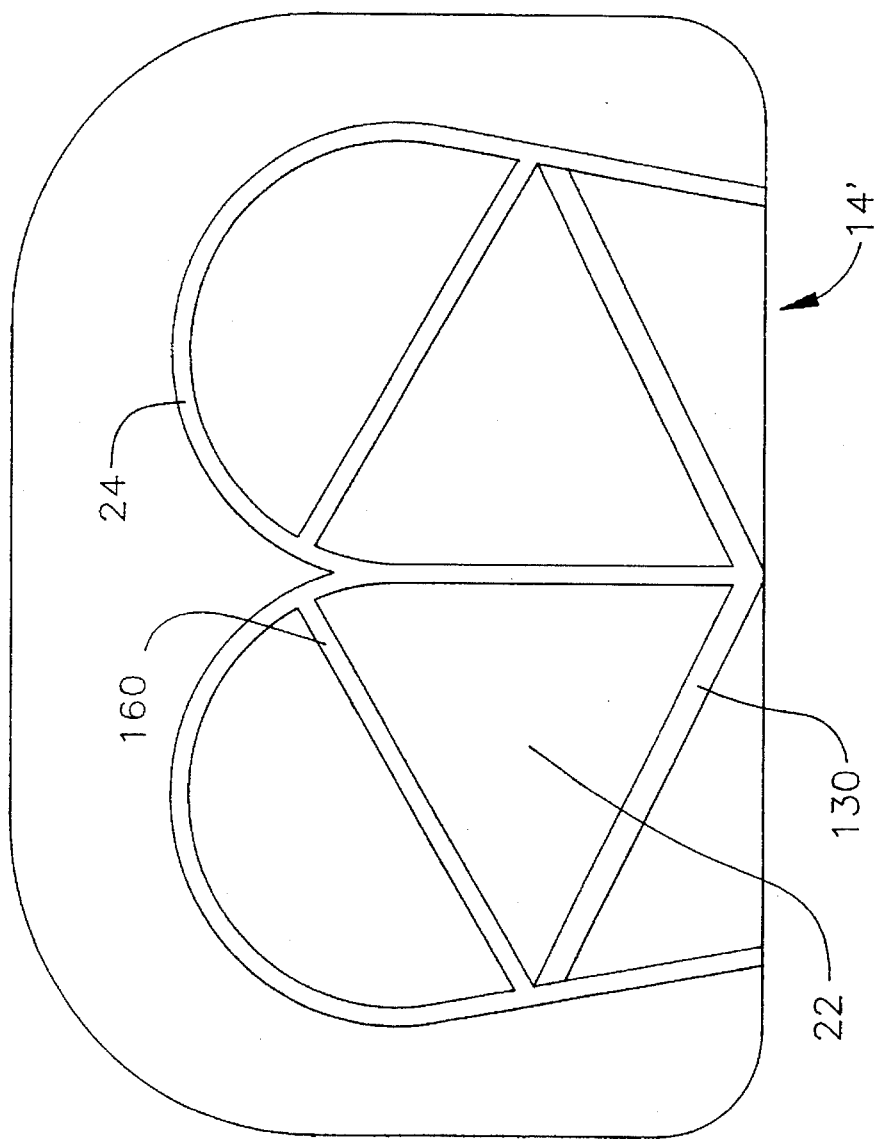
FIG. 13 is an alternative embodiment of a lower platen of the apparatus of FIG. 1 adapted for apportioning a chicken breast butterfly into four (4) cuts each having a controlled volumetric size and weight.

It may be appreciated with general reference to the figures that die 12 and lower platens 14 are specifically configured for illustrative purposes to receive and apportion a butterfly cut 150 of FIG. 12 into a pair of "ice cream cone-shaped" products. However, and as is shown at 14' in FIG. 13, each lower platen 14 may be configured to effect the quartered apportioning of a butterfly cut 150 via the provision of a transverse slot, 160, and the reconfiguration of die 12 (not shown) to be received therein. Moreover, although it is anticipated that apparatus 10 of the present invention will find particular acceptance in the apportioning of whole muscle poultry meat and especially of chicken breast butterflies, the apparatus is readily adaptable to the processing of other whole muscle meat products such as poultry thigh meat, and pork or beef fillets.

Figure 8:
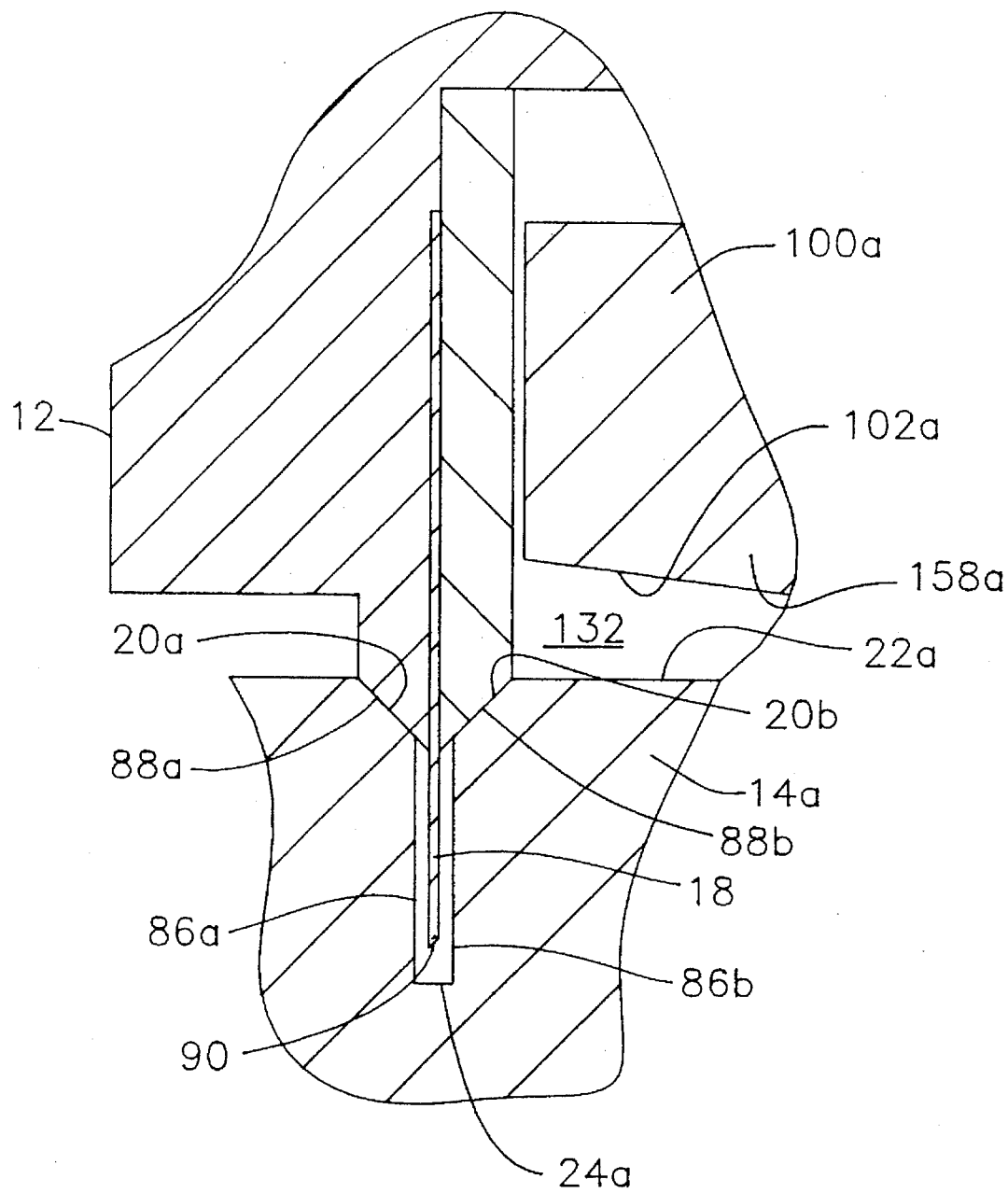
FIG. 8 is an enlarged sectional view of FIG. 7.

With general reference to FIG. 8, it may be appreciated that die 12 optionally may be provided to include a fluid conduit (not shown) extending to circumscribe at least a portion of blade portion 18 and a compression surface 20. The fluid conduit may be formed as having a plurality of orifices confronting a support surface 22 of a lower platen 14 when die 12 is disposed in its second position. Each orifice may be configured to express a pressurized fluid, such as potable water or air, from a supply source (not shown) for removing the trim portions 154 (FIG. 12) separated from each meat cut 150. The movement of die 12 toward a lower platen 14 advantageously effects a reduction in the cross-sectional area therebetween which results, for a given fluid flow rate, in an increased fluid velocity and a correspondingly increased cleaning effectiveness. Overall, a measure of automation is achieved by virtue of the provision of the fluid conduit in obviating the need to provide for the manual removal of the separated trim portions. Alternatively, a nozzle may be mounted on apparatus 10 adjacent the position of platform 14a shown in FIG. 1 for expressing of stream of pressurized fluid such as air or the like to assist in removing the separated trim portions from lower platens 14.

For receiving lower platens 14 in registration with upper die 12, a support assembly may be provided as is shown at 180 in FIGS. 6 and 7. Support assembly 180 may include a pair of transverse runners, 182a–b, each configured as having a pair of ramped ends, 184a–b and 185a–b, respectively, for guiding the generally angular movement of a lower platen 14 thereon. Runners 182 are generally upwardly biased to space a received lower platen 14 a predetermined distance above a pair of foot portions, 186a and 186b, of frame 82 via a plurality of compressible springs, one of which is shown at 187 as coaxially aligned on a corresponding threaded member, 188. Each of springs 187 is interposed for compression between a runner 182 and a corresponding flange, one of which is shown at 190 as outwardly extending from frame 32 for supporting a threaded member 188. For adjusting the distance from which runners 182 space the received lower platen 14 above foot portions 186, each threaded member 188 may be provided as extending through each flange 190 to a threaded terminal end, 192. Onto each terminal end 192 is threadably engaged an adjustable stop member, one of which is shown at 194 as a locking pair of nuts. With upper die 12 bearing, for example, on lower platen 14a, runners 182 thereby may be urged downwardly into an orientation wherein lower platen 14a is supported on foot portions 186 of frame 82. Such an arrangement will be appreciated to accommodate for variances in alignment or other tolerance as between upper die 12 and lower platens 14.

Looking now to FIG. 1.4, apparatus 10 of the present invention is depicted generally at 10' as modified to include several conveyor assemblies, shown respectively at 200, 210, and 220. In this regard, first conveyor assembly 200 is disposed to receive the separated trim portions from the support surfaces 22 of lower platens 14 for removal from apparatus 10'. Likewise, second conveyor 210 is disposed to receive the apportioned product from the support surfaces 22 of lower platens 14, with third conveyor 220 being disposed for conveying unapportioned cuts of whole muscle meat for loading onto a platen 14 of apparatus 10'. With respect to second conveyor 210, a wiper member, 212, advantageously may be provided as having a confrontation surface, 214, disposed to contact and remove the apportioned products from the support surfaces 22 of lower platens 14 as each of the lower platens is cycled out of registration with die 12. Alternatively, an articulated blade, arm, or the like (not shown) may be provided to remove the apportioned products from the support surfaces 22 of lower platens 14. Again, a degree of automation is achieved in that the need to provide for the manual removal of the apportioned products is obviated.

In general operation, and with specific reference to FIGS. 1 and 7, with an unapportioned poultry breast butterfly cut loaded on lower platen 14d, spindle 72 of rotating turntable 66 is received within rebate 78d of follower member 76 to drive shaft 60 effecting the rotation of hub 52 moving lower platen 14d to first station 1 in registration with upper platen 12. Cylinder 80 of actuator assembly 16 then is actuated to extend ram 84 thereof moving upper die 12 downwardly from its upper, non-cutting position shown in FIG. 6 to its lower, cutting position shown in FIG. 7. With the movement of upper die 12, spring members 120 extend to bias support plate 112 in the orientation shown in FIG. 7 disposing upper platens 100 in their lower positions wherein contact surfaces 102 thereof engage and irreversibly compress the meat cut to a select thickness. Such compression also is effective to substantially fill each interior cavity 132 of select volume defined by a lower platen support surface 22, a die recess 104, an upstanding wall 130, and an upper platen forward contact surface 102. With upper platens 100 biased in their lower positions compressing the meat cut, the downward movement of die 12 continues, with upper platens 100 being received within recesses 104, to its lower position. In that position, blade portion 18 of die 12 is received in a shearing arrangement within slot 24 of the lower platen 14d with compression surfaces 20 of die 12 being made to abuttingly engage bearing surfaces 88 of the lower platen effective to completely sever the cut into an apportioned product and an excess trim portion. The apportioned product is sized to a consistent shape, thickness, and weight, and advantageously maintains its net shape both in a raw and in a cooked form.

With the meat cut being apportioned and die 12 still in its lower position, pressurized fluid may be expressed for removing the separated trim portions from the support surface 22d of the lower platen 14d. In this regard, the trim portions may be passed directly onto first conveyor 200 shown in FIG. 14 for removal. Thereafter, cylinder 80 of actuator assembly 16 again is actuated to retract ram 84 thereof moving upper die 12 to its upper position shown in FIG. 6 to be spaced apart from the lower die 14. Springs 120 are compressed by this movement of die 12 to concomitantly move upper platens 100 to their like upper positions spaced apart from the lower platen 14d. The retraction of ram 84 of cylinder 80 may be controlled in response to the fluid pressure developed within cylinder 80. That is, the fluid pressure may be monitored for the development of a threshold pressure indicating the abutting engagement of compression surfaces 20 of die 12 with bearing surfaces 88 of lower platen 14.

Figure 14:
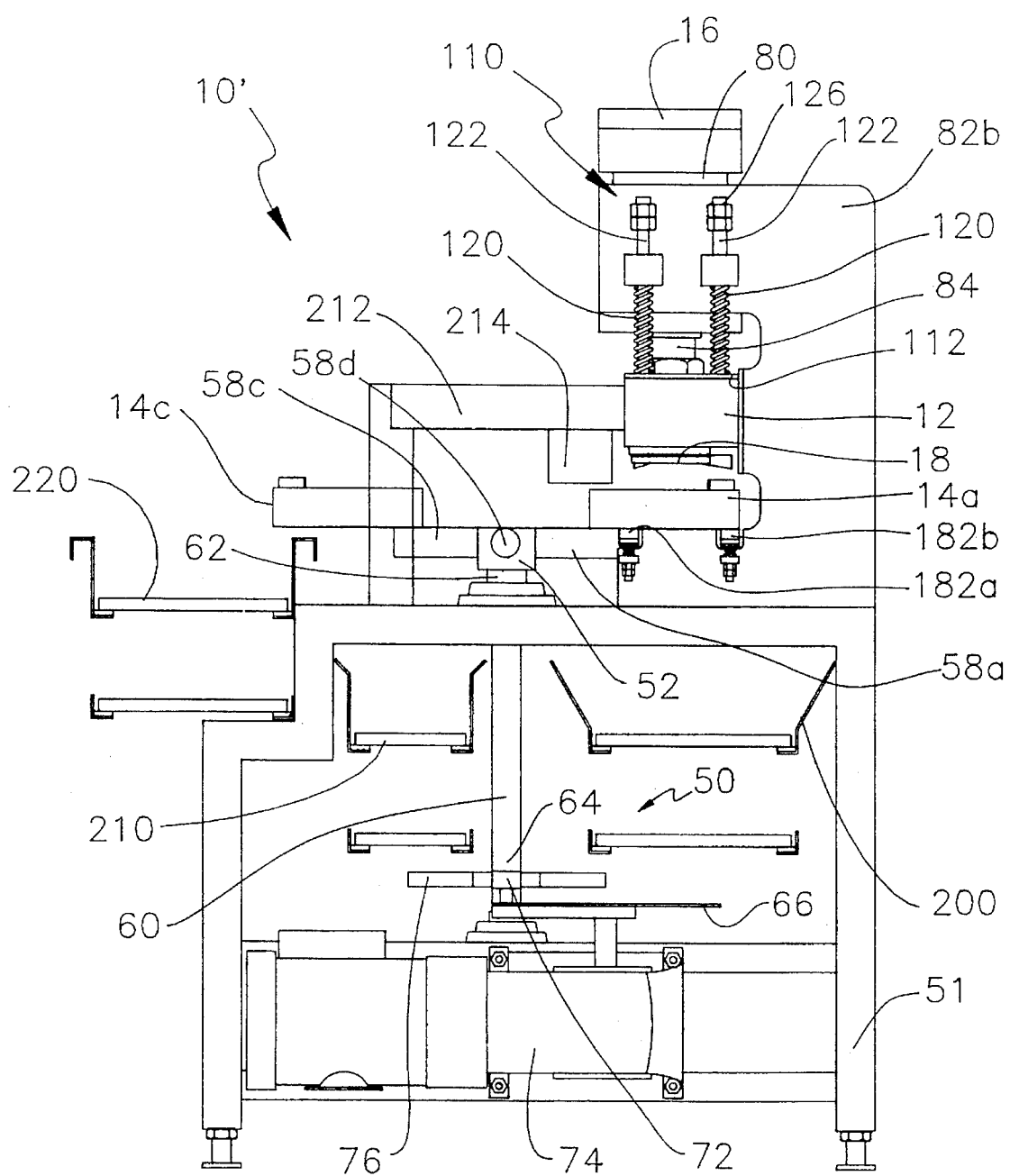
FIG. 14 is a front view of the apparatus of FIG. 1 as modified to include trim, feed, and product conveyor assemblies.

The apportioning of the meat cut completed, spindle 72 of rotating turntable 66 is received within rebate 78c of follower member 76 effecting the rotation of platen 14d to a second and a third station out of registration with upper die 12. Intermediate, for example, second and third stations 2 and 3 (FIG. 4), the apportioned product may be made removed from support 22*d* of the lower platen via contact with confrontation surface 214 of wiper member 212 (FIG. 14). Again, the apportioned product may be removed from the lower platen 14*d* directly onto second conveyor 210 of FIG. 14 for conveyance from the apparatus. Completing the cycle, the lower platen 14*d* may be loaded from conveyor 220 of FIG. 14, and then rotated to a fourth station for further staging prior to its rotation again into registration with upper die 12.

Figure 15:
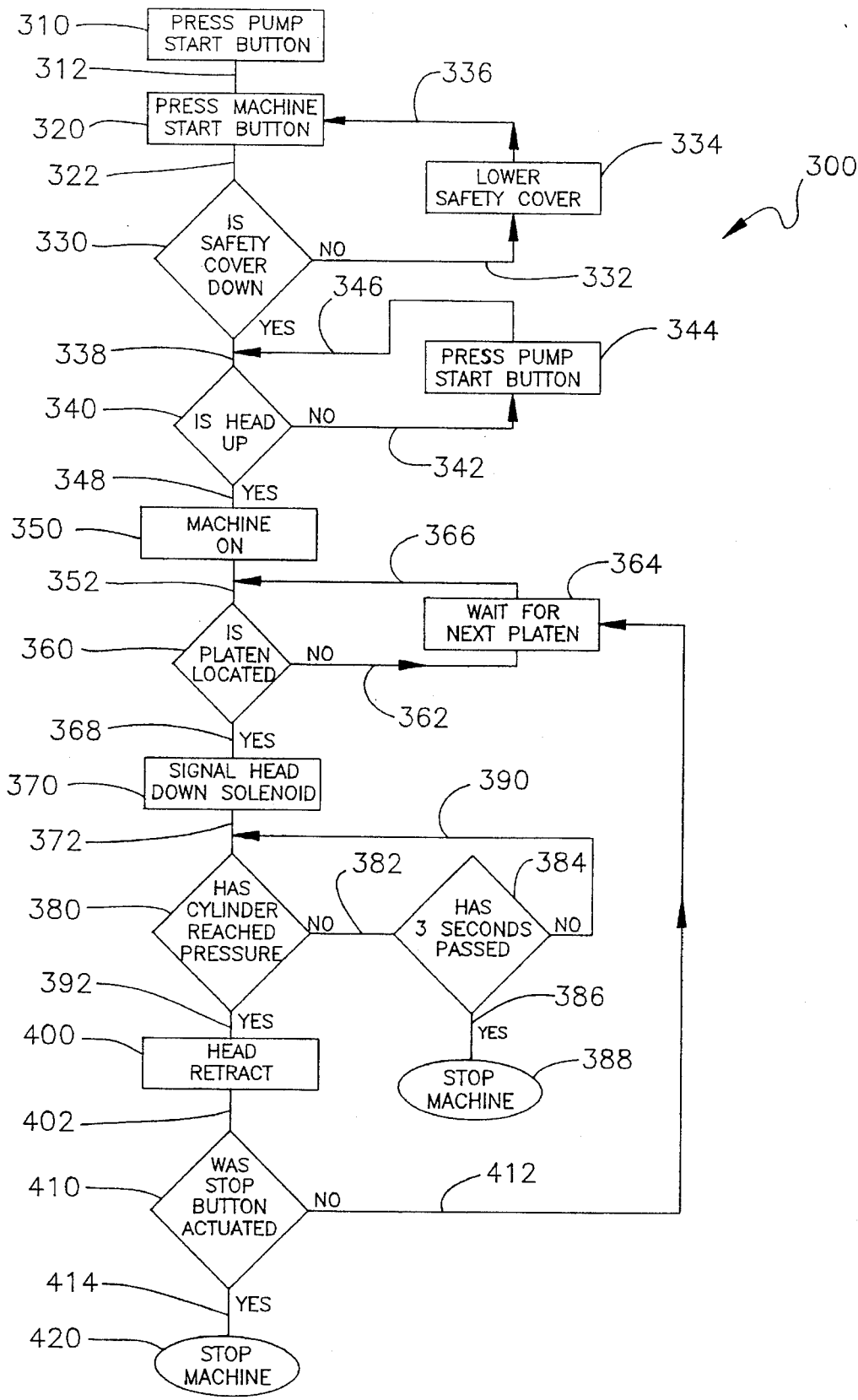
FIG. 15 is a schematic flow diagram of a representative sequence of operational steps for controlling the apparatus of the present invention to effect the apportioning of a cut of whole muscle meat.

Referring lastly to FIG. 15, the previously described sequence of operations under which apparatus 10 of the present invention may be controlled is further detailed schematically at 300. In this regard, entry into the operational sequence 300 is represented at block 310 with the actuation of a start button initiating a pump for providing hydraulic fluid controlling of hydraulic cylinder 80. Block 310 leads via line 312 to a start-up procedure, represented at 320, wherein apparatus 10 is energized by the actuation of a second start button. Following these initializations, block 320 leads via line 322 to a query, represented at block 330, to determine whether a safety cover, which may be provided to restrict access to die 12, is in position. In the event that the query at block 330 is in the negative, the program is looped via line 332 to block 334 to effect the lowering of the safety cover and the return via line 336 to block 320. In the event, however, that the query at block 330 is in the affirmative, the sequence progresses via line 338 to block 340.

At block 340, another query is made to determine if cylinder 80 is retracted. If the query at block 340 is in the negative, the sequence is looped via line 342 to block 344 to call for the actuation of the pump start button and the return via line 346 to block 340. If however, the query at block 340 is in the affirmative, the program then progresses via line 348 to block 350 indicating that apparatus 10 is energized. From block 350, another query at block 360 is entered via line 352 for a determination of whether a lower platen 14 is located in registration with upper die 12. If no platen 14 is so located, the sequence proceeds via line 362 to block 364 to wait for the indexing of the next platen 14, and then is returned to block 360 via line 366. If a lower platen 14 is determined to be in registration with upper die 12, block 370 is entered via line 368 for the actuation of a solenoid valve or the like effecting the movement of upper die 12 from its first position spaced a predetermined distance from a lower platen 14, to its second position wherein compression surface 20 of die 12 is abuttingly engaged with at least one corresponding bearing surface 88 of a lower platen 14.

From block 370, the sequence then progresses via line 372 to block 380 for inquiring whether cylinder 80 has reached a predetermined fluid pressure indicating the abutting engagement of compression surfaces 20 of die 12 with corresponding bearing surfaces 88 of a lower platen 14. As a safety measure, if the fluid pressure has not been reached, a loop is entered via line 382 for a time-out function represented at block 384. If the time-out period which may be, for example, three (3) seconds has run, the sequence proceeds via line 386 directly to termination at node 388. If, however, the time-out period has not run, the sequence returns to the pressure inquiry at 380 via line 390 for looping again to the time-out inquiry at block 384, or for proceeding on to block 400 via line 392.

At block 400, cylinder 80 is retracted to move die 12 from its lower or cutting position to its upper or non-cutting position. After that retraction, a query at block 410 is entered via line 402 for determining whether a stop button had been actuation. If the query is in the negative, the sequence is looped via line 412 to block 364 where a next die 14 is awaited for movement into registration with upper die 12. If, however, the query is in the affirmative, the sequence proceeds via line 414 directly to termination at node 420.

It is anticipated that certain changes may be made in the present invention without departing from the precepts herein involved. Accordingly, it is intended that all matter contained in the foregoing description shall be interpreted as illustrative and not in a limiting sense.

What is claimed:

1. Apparatus for apportioning a cut of whole muscle meat into a product having margins of a select size and an excess trim portion comprising:

an upper die having a forward blade portion and a rearward compression surface extending about said blade portion, said blade portion defining with said compression surface at least a portion of the margins of the product;

at least one lower platen having a support surface for receiving said cut of whole muscle meat thereon, said support surface having a slot configured to receive said blade portion therewithin intermediate a first and second side wall thereof, and a bearing surface configured to abuttingly engage said compression surface; and an actuator assembly for moving said upper die from a first position spaced above said lower platen to a second position wherein said compression surface abuttingly engages said bearing surface effective to apportion the cut of whole muscle meat into the product and trim portion.

2. The apparatus of claim 1 wherein said blade portion of said upper die is received within said slot in a shearing arrangement with at least one said side wall thereof when said lower platen is in said second position.

3. The apparatus of claim 1 which further comprises at least one upper platen having a forward contact surface and movable from an upper position spaced above said lower platen to a lower position wherein said contact surface engages said cut of whole muscle meat effective for its irreversible compression to a select thickness, and wherein said die is formed as having at least one central recess at least partially circumscribed by said blade portion and said compression surface, said recess being configured to receive at least a portion of said upper platen therewith as said upper die is moved to said second position with said lower platen disposed in said lower position.

4. The apparatus of claim 3 further comprising a biasing assembly for normally biasing said upper platen in said lower position, said biasing assembly being compressible by the movement of said die to said first position to move said upper platen to said upper position.

5. The apparatus of claim 4 wherein said apparatus includes a frame supporting said upper die and said lower platen, and wherein said biasing assembly comprises:

a support plate mounted above said die for movement along said frame;

at least one coupling member extending through said die from a first end fastened to said support plate to a second end fastened to said upper platen; and at least one spring member interposed between said frame and said support plate for normally biasing said support plate in an orientation disposing said upper platen in said lower position, said die being movable intermediate said support plate and said lower platen from said second position into an abutting engagement with said support plate moving said support plate along said frame into an orientation disposing said upper platen in said upper position.

6. The apparatus of claim 3 wherein said lower platen further comprises a generally upstanding wall extending on said lower platen support surface to define an interior cavity of a select volume with said support surface, said die recess, and said upper platen forward contact surface when said die is disposed in said second position and said upper platen is disposed in said lower position, said cut of whole muscle meat being irreversibly compressed by said upper platen effective to substantially fill said interior cavity.

7. The apparatus of claim 6 wherein said forward contact surface of said upper platen is formed as having a profile selected to conform to the surface geometry of said cut of muscle meat effective to fill said interior cavity therewith.

8. The apparatus of claim 1 including at least a pair of lower platens, and an indexing assembly for cycling each said platen between a first station disposed in registration with said upper die, and at least a second station out of registration with said upper die.

9. The apparatus of claim 8 wherein said indexing assembly comprises:
a hub mounted for rotation about a first axis having at least a pair of generally outwardly extending arms, each of said arms supporting a corresponding one of said lower platens;
a shaft extending along said first axis from a first end coupled to said hub to a second end;
a turntable member mounted for rotation about a second axis spaced-apart from said first axis, said turntable member having a generally circular periphery and an upstanding spindle disposed adjacent said periphery;
a drive motor coupled to said turntable member for its rotation driving said spindle along a generally circular locus; and
a follower member coupled to the second end of said shaft, said follower member having at least one pair of opposing rebates, each of said rebates extending radially inwardly toward said first axis, and each being successively engaged by said spindle for driving said shaft and rotating said hub to cycle each of said lower platens from between at least said first station and said second station.

10. The apparatus of claim 8 further comprising a wiper member having a confrontation surface disposed to contact and remove the product from said support surface of said lower platen as each of said lower platens is cycled from said first station to said second station.

11. Apparatus for apportioning a cut of whole muscle meat into a product having margins of a select size and an excess trim portion comprising:
an upper die having a forward blade portion and a rearward compression surface extending about said blade portion, said blade portion defining with said compression surface at least a portion of the margins of the product;
at least four lower platens each having a support surface for receiving said cut of whole muscle meat thereon, each said support surface having a slot configured to receive said blade portion therewithin intermediate a first and second side wall thereof, and a beating surface configured to abuttingly engage said compression surface;
an actuator assembly for moving said upper die from a first position spaced above one of said lower platens to a second position wherein said compression surface abuttingly engages said beating surface effective to apportion said cut of whole muscle meat into the product and trim portion; and
an indexing assembly for successively cycling each said of said platens between a first station disposed in registration with said upper die, and at least a second, third, and fourth station out of registration with said upper die.

12. The apparatus of claim 11 wherein said blade portion of said upper die is received within said slot in a shearing arrangement with at least one said side wall thereof when said lower platen is in said second position.

13. The apparatus of claim 11 wherein said indexing assembly comprises:
a hub mounted for rotation about a first axis having at least four generally outwardly extending arms, each of said arms supporting a corresponding one of said lower platens;
a shaft extending along said first axis from a first end coupled to said hub to a second end;
a turntable member mounted for rotation about a second axis spaced-apart from said first axis, said turntable member having a generally circular periphery and an upstanding spindle disposed adjacent said periphery;
a drive motor coupled to said turntable member for its rotation driving said spindle along a generally circular locus; and
a follower member coupled to the second end of said shaft, said follower member having at least two pairs of opposing rebates, each of said rebates extending radially inwardly toward said first axis, and being successively engaged by said spindle for driving said shaft and rotating said hub to cycle each of said lower platens from between each said station.

14. The apparatus of claim 13 further comprising a wiper member having a confrontation surface disposed to contact and remove the product from said support surface of said lower platens as each of said lower platens is cycled from said first station to said second station.

15. The apparatus of claim 11 which further comprises at least one upper platen having a forward contact surface and movable from an upper position spaced above one of said lower platens to a lower position wherein said contact surface engages said cut of whole muscle meat effective for its irreversible compression to a select thickness, and wherein said die is formed as having at least one central recess at least partially circumscribed by said blade portion and said compression surface, said recess being configured to receive at least a portion of said upper platen therewithin as said upper die is moved to said second position with said lower platen disposed in said lower position.

16. The apparatus of claim 15 further comprising a biasing assembly for normally biasing said upper platen in said lower position, said biasing assembly being compressible by the movement of said die to said first position to move said upper platen to said upper position.

17. The apparatus of claim 16 wherein said apparatus includes a frame supporting said upper die and said lower platen, and wherein said biasing assembly comprises:
a support plate mounted above said die for movement along said frame;
at least one coupling member extending through said die from a first end fastened to said support plate to a second end fastened to said upper platen; and
at least one spring member interposed between said frame and said support plate for normally biasing said support plate in an orientation disposing said upper platen in said lower position, said die being movable intermediate said support plate and said lower platen from said second position into an abutting engagement with said support plate moving said support plate along said frame into an orientation disposing said upper platen in said upper position.

18. The apparatus of claim 11 further comprising:

a first conveyor assembly for receiving the trim portion from the support surface of said lower platens for the conveyance of the trim portion from said apparatus;

a second conveyor assembly for receiving the product from the support surface of said lower platens for the conveyance of the trim portion from said apparatus; and a third conveyor assembly for conveying said cut of whole muscle meat to said apparatus.

19. A method for apportioning a cut of whole muscle meat into a product having margins of a select size and an excess trim portion, said method comprising the steps of:

(a) providing an upper die having a forward blade portion and a rearward compression surface extending about said blade portion, said blade portion defining with said compression surface at least a portion of the margins of the product;

(b) providing at least one lower platen having a support surface for receiving said cut of whole muscle meat thereon, said support surface having a slot configured to receive said blade portion therewithin intermediate a first and second side wall thereof, and a bearing surface configured to abuttingly engage said compression surface; and (c) disposing said cut of whole muscle meat on said support surface of said lower platen; and (d) moving said upper die from a first position spaced above said lower platen to a second position wherein said compression surface abuttingly engages said bearing surface effective to apportion said cut of whole muscle meat into the product and trim portion.

20. The method of claim 19 wherein said blade portion of said upper die is received within said slot in a shearing arrangement with at least one said side wall thereof when said lower platen is in said second position.

21. The method claim 19 further comprising the step prior to step (d) of irreversibly compressing said cut of whole muscle meat effective to a select thickness.

22. The method of claim 21 wherein said upper die and said lower platen are provided as defining an interior cavity of a select volume therebetween when said die is disposed in said second position, and wherein said cut of whole muscle meat is irreversibly compressed to substantially fill said cavity.

* * * * *